United States Patent
Ponnuswamy (10) Patent No.: US 10,812,344 B2
(45) Date of Patent: Oct. 20, 2020

(54) EXECUTING A CORRECTIVE ACTION IN RESPONSE TO DETECTING A PARTICULAR PATTERN IN A PERFORMANCE LEVEL OF A WIRELESS CONNECTION

(71) Applicant: Facebook, Inc, Menlo Park, CA (US)

(72) Inventor: Subbu Ponnuswamy, Saratoga, CA (US)

(73) Assignee: Facebook, Inc., Menlo Park, CA (US)

( * ) Notice: Subject to any disclaimer, the term of this patent is extended or adjusted under 35 U.S.C. 154(b) by 859 days.

(21) Appl. No.: 14/926,804

(22) Filed: Oct. 29, 2015

(65) Prior Publication Data
US 2017/0126483 A1 May 4, 2017

(51) Int. Cl.
| | | |
|---|---|---|
| *H04L 12/24* | (2006.01) | |
| *H04L 12/26* | (2006.01) | |
| *H04W 76/19* | (2018.01) | |
| *H04W 24/08* | (2009.01) | |
| *H04W 12/06* | (2009.01) | |
| *H04W 84/12* | (2009.01) | |
| *H04L 29/12* | (2006.01) | |

(52) U.S. Cl.
CPC .......... *H04L 41/5025* (2013.01); *H04L 43/08* (2013.01); *H04W 12/0608* (2019.01); *H04W 24/08* (2013.01); *H04W 76/19* (2018.02); *H04L 61/2015* (2013.01); *H04W 84/12* (2013.01)

(58) Field of Classification Search
USPC ........................................................ 370/216
See application file for complete search history.

(56) References Cited

U.S. PATENT DOCUMENTS

| | | | | |
|---|---|---|---|---|
| 8,339,991 | B2 * | 12/2012 | Biswas | H04L 41/04 370/254 |
| 2007/0002833 | A1 * | 1/2007 | Bajic | H04L 29/1282 370/352 |
| 2008/0008165 | A1 * | 1/2008 | Ikeda | H04L 45/00 370/360 |
| 2008/0052628 | A1 * | 2/2008 | Bugenhagen | H04L 41/0896 715/736 |
| 2011/0216692 | A1 * | 9/2011 | Lundsgaard | H04W 48/20 370/328 |
| 2012/0257536 | A1 * | 10/2012 | Kholaif | H04W 48/20 370/254 |
| 2013/0121325 | A1 * | 5/2013 | McCann | H04W 48/12 370/338 |

* cited by examiner

*Primary Examiner* — Gregory B Sefcheck
*Assistant Examiner* — Majid Esmaeilian
(74) *Attorney, Agent, or Firm* — Brian R. Short (57) ABSTRACT

A system and method of executing a corrective action in response to detecting a particular pattern in a performance level of a wireless connection is disclosed. A prior performance level associated with a wireless connection and a current performance level associated with the wireless connection are determined. The current performance level is determined to be lower than the prior performance level. Responsive to determining that the current performance level is lower than the prior performance level, a corrective action is selected from a set of corrective actions, and the selected corrective action is executed.

20 Claims, 5 Drawing Sheets

EXECUTING A CORRECTIVE ACTION IN RESPONSE TO DETECTING A PARTICULAR PATTERN IN A PERFORMANCE LEVEL OF A WIRELESS CONNECTION

TECHNICAL FIELD

The present disclosure relates to corrective actions for a wireless environment. In particular, the present disclosure relates to executing a corrective action in response to detecting a decrease in performance of a wireless connection.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band.

Client devices within WLANs communicate with network devices to obtain access to one or more network resources. Network devices, such as access points, are digital devices that may be communicatively coupled to one or more networks (e.g., Internet, an intranet, etc.). Network devices may be directly connected to the one or more networks or connected via a controller. A network device, as referred to herein, may include a wireless Access Point (AP) that communicates wirelessly with devices using Wi-Fi, Bluetooth or related standards and that communicates with a wired network. A network device may provide a wireless coverage area, within which devices may wirelessly connect to a network through the network device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

A. General Overview

In one or more embodiments, a corrective action is executed in response to detecting a decrease in performance of a wireless connection. A prior performance level and a current performance level of a wireless connection are determined. Responsive to determining that the current performance level is lower than the prior performance level, a corrective action is selected and executed. The corrective action may, for example, improve the performance of the current performance level, prevent reduction of the current performance level, and/or result in avoiding failure of the wireless connection.

In one or more embodiments, an 802.11 authentication process that was previously successfully completed for a client device is re-executed for the client device. The 802.11 authentication process is re-executed in response to determining that the client device (a) did not receive an Internet Protocol (IP) address assignment within a particular time period and/or (b) did not complete a network authentication process for connecting to a network within a particular time period. In an embodiment, the 802.11 authentication process is re-executed without presenting an error notification to a user.

B. Architectural Overview

Figure 1:
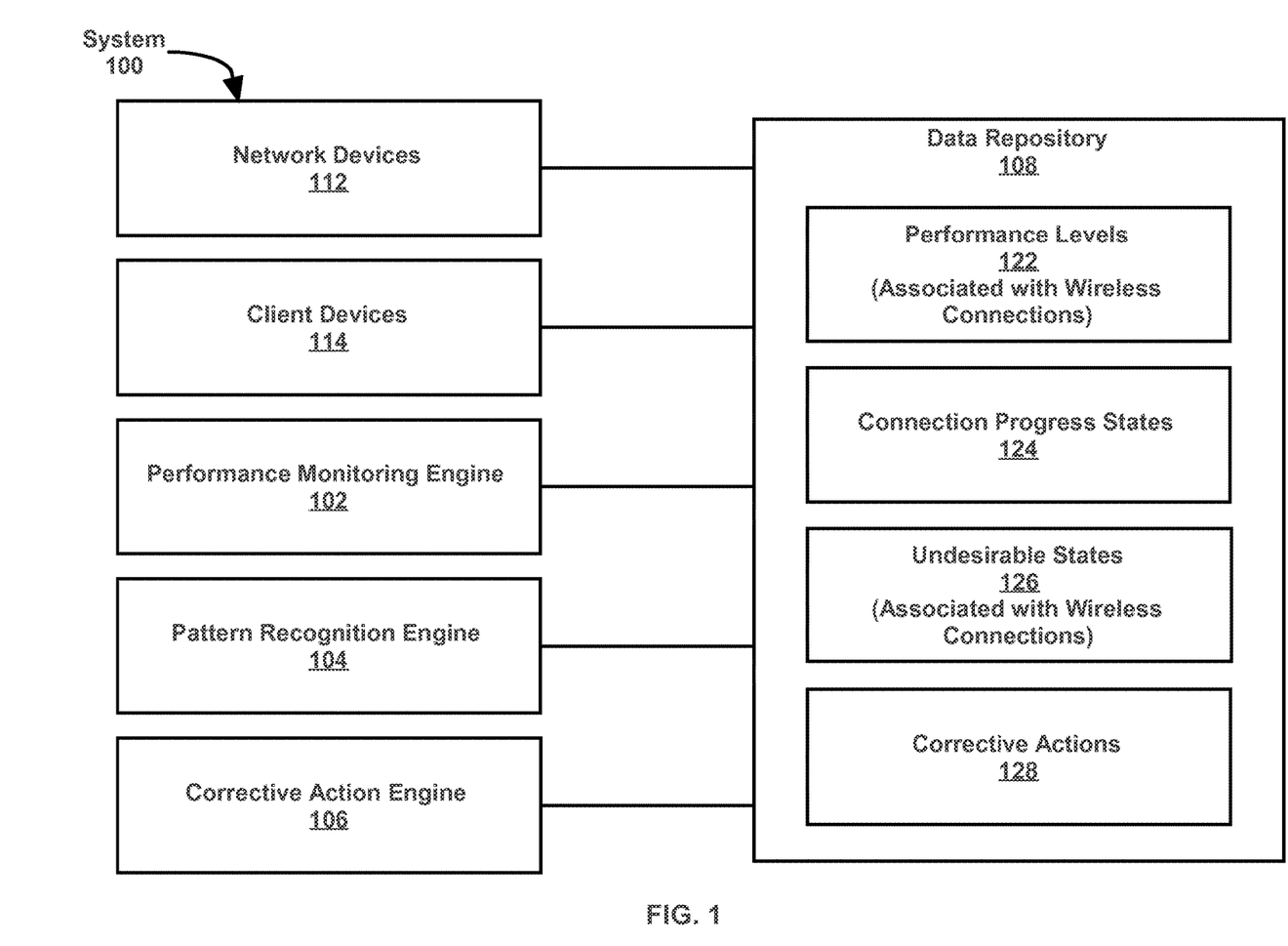
FIG. 1 shows a block diagram example of a system in accordance with one or more embodiments.

FIG. 1 shows a block diagram example of a system in accordance with one or more embodiments. As illustrated in FIG. 1, system 100 includes one or more network devices 112, one or more client devices 114, performance monitoring engine 102, pattern recognition engine 104, corrective action engine 106, and data repository 108. In one or more embodiments, system 100 may include more or fewer components, than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, network devices 112 are digital devices that facilitate access to one or more network resources by one or more other digital devices (such as client devices 114). The term "digital device" generally refers to any hardware device that includes a processor. A digital device may refer to a physical controller device or a hardware device executing a virtual controller. Examples of digital devices include a computer, a tablet, a laptop, a desktop, a netbook, a server, a web server, authentication server, an authentication-authorization-accounting (AAA)

server, a Domain Name System (DNS) server, a Dynamic Host Configuration Protocol (DHCP) server, a Remote Authentication Dial-In User Service (RADIUS) server, a Lightweight Directory Access Protocol (LDAP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant (PDA), a wireless receiver and/or transmitter, a base station, a communication management device, a router, a switch, a cloud server, a cloud controller, a controller, an Access Point (AP), and a wireless access point (WAP).

In an embodiment, network devices 112 include one or more digital devices having functionality to transmit and/or receive information from each other without being connected by an electrical conductor. A digital device having functionality to transmit and/or receive information from each other without being connected by an electrical conductor is referred to herein as a "wireless device." The functionality to wirelessly communicate may be implemented through, for example, an IEEE 802.11 wireless interface. Each of network devices 112 is associated with an identifier (ID).

In one or more embodiment, client devices 114 are digital devices that are configured to connect to one or more network resources through one or more other digital devices (such as network devices 112). Client devices 114 may be configured to receive, through the network resources, web traffic, voice data streams, video data streams, and/or any other type of data. In an example, client devices 114 transmit and/or receive wireless signals based on IEEE 802.11 standards. Each of client devices 114 is associated with an identifier (ID).

In one or more embodiments, data repository 108 is any type of storage unit and/or device (e.g., a file system, database, collection of tables, or any other storage mechanism) for storing data. Further, data repository 108 may include multiple different storage units and/or devices. The multiple different storage units and/or devices may or may not be of the same type or located at the same physical site. Further, data repository 108 may be or may execute on the same computing system as performance monitoring engine 102, pattern recognition engine 104, and/or corrective action engine 106. Alternatively or additionally, data repository 108 may be on a separate computing system than performance monitoring engine 102, pattern recognition engine 104, and/or corrective action engine 106. Data repository 108 may be connected to performance monitoring engine 102, pattern recognition engine 104, and/or corrective action engine 106 via a direct connection or via a network.

Data sets describing one or more performance levels 122 associated with wireless connections, one or more connection progress states 124, one or more undesirable states 126 associated with wireless connections, and one or more corrective actions 128 may be implemented across any of components within system 100. However, these data sets are illustrated within data repository 108 for purposes of clarity and explanation.

In one or more embodiments, performance levels 122 include attributes related to a connection between an access point and a client device. Examples of performance levels 122 include but are not limited to:
 (a) an amount of time needed for a client device to switch from associating with a first access point to associating with a second access point;
 (b) a received signal strength or a Signal-To-Noise Ratio (SNR) of wireless signals exchanged between a client device and an access point; and
 (c) a rate at which data is exchanged between a client device and an access point.

In an embodiment, performance levels 122 include one or more current performance levels and one or more prior performance levels. Prior performance levels are performance levels that were previously identified and stored in a database or other memory. In one example, current performance level may refer to a last-measured or last-detected performance level. A prior performance level may refer to a performance levels that were measured or detected before the last-measured or last-detected performance level. In another example, the current performance level may refer to measurements in the last x seconds or minutes and the prior performance level may refer to measurements prior to the last x seconds or minutes.

In one or more embodiments, connection progress states 124 are states of progress for establishing a wireless connection. Establishing a wireless connection involves, for example, an 802.11 authentication process, a network authentication process, and an Internet Protocol (IP) address assignment process. Further details of these processes are described below with reference to FIG. 3.

In one or more embodiments, undesirable states 126 include circumstances negatively impacting a user's experience with a wireless connection. For example, an undesirable state is a failure state of a wireless connection. As another example, an undesirable state is a loss of a wireless connection. The loss of the wireless connection may be due to a signal strength or SNR of received wireless signals exchanged between a client device and an access point falling below a threshold. Additionally or alternatively, the loss of the wireless connection may be due to an excess amount of time needed to switch access points. As another example, an undesirable state is an inability to establish a wireless connection within a particular time period. As another example, an undesirable state is the presentation of an error message to a user.

In one or more embodiments, corrective actions 128 include actions that may be performed to correct, improve, or change a performance level and/or connection progress state. Correction actions 128 may, for example, improve the current performance level associated with the wireless connection, prevent reduction of the current performance level, and/or result in avoiding failure of the wireless connection. Examples of corrective actions 128 include but are not limited to:
 (a) terminating a wireless connection between a client device and an access point,
 (b) resetting a wireless connection between a client device and an access point,
 (c) forcing a client device to switch from associating with a first access point to associating with a second access point,
 (d) modifying one or more wireless configurations of a network device,
 (e) modifying one or more wireless configurations of a client device,
 (f) re-executing a 802.11 authentication process,
 (g) re-executing a network authentication process, and
 (h) re-executing a process for obtaining an IP address assignment.

In an embodiment, wireless configurations of a network device include but are not limited to a transmit power, a MCS or PHY rate, a probe response threshold, a disassociate threshold, a receive sensitivity, a receive gain, a transmit cell size, a receive cell size, and a RF channel.

In an embodiment, wireless configurations of a client device include but are not limited to a transmit power, a MCS or PHY rate, a retry rate, and an aggregation size.

In one or more embodiments, performance monitoring engine 102 refers to hardware and/or software configured to perform operations described herein for monitoring and/or detecting performance levels 122 and/or connection progress states 124. Pattern recognition engine 104 refers to hardware and/or software configured to perform operations described herein for recognizing a pattern associated with performance levels 122 and/or connection progress states 124. Pattern recognition engine 104 may determine likelihoods of undesirable states 126 based on the pattern. Corrective action engine 106 refers to hardware and/or software configured to perform operations described herein for selecting and applying corrective actions 128.

In one or more embodiments, performance monitoring engine 102, pattern recognition engine 104, and/or corrective action engine 106 may be implemented on one or more digital devices. In an example, performance monitoring engine 102, pattern recognition engine 104, and/or corrective action engine 106 is the same as or implemented on a same device as one or more network devices 112 and/or client devices 114. In another example, performance monitoring engine 102, pattern recognition engine 104, and/or corrective action engine 106 is implemented on a separate device from network devices 112 and/or client devices 114, such as at a controller and/or a server located in a cloud computing environment. Examples of operations performed by the performance monitoring engine 102, pattern recognition engine 104, and/or corrective action engine 106 are described below with reference to FIGS. 2 and 3.

Figure 2:
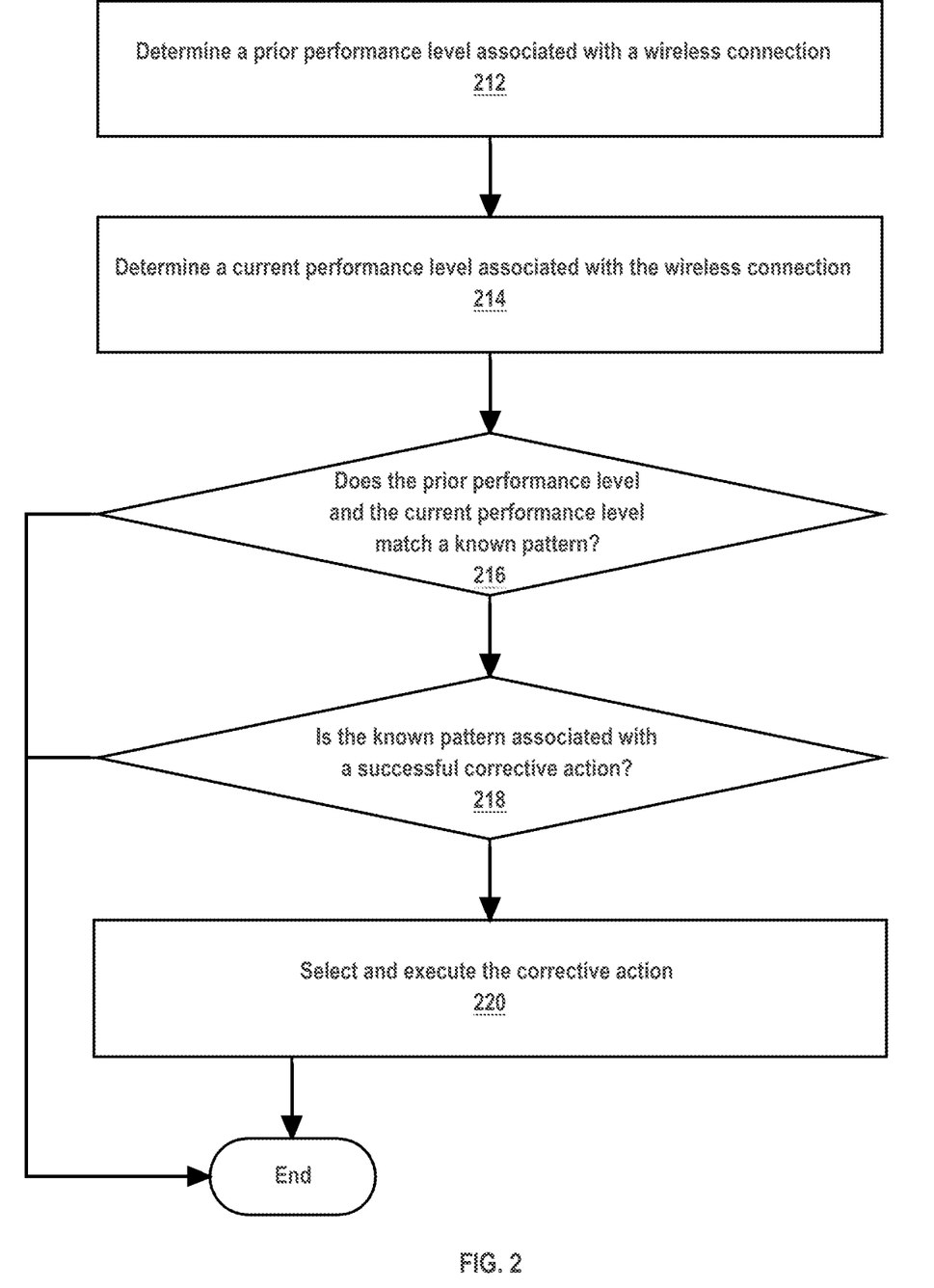
FIG. 2 shows an example set of operations for executing a corrective action in response to detecting a particular pattern in a performance level of a wireless connection in accordance with one or more embodiments.

C. Executing a Corrective Action in Response to Detecting a Particular Pattern in a Performance Level of a Wireless Connection FIG. 2 shows an example set of operations for executing a corrective action in response to detecting a particular pattern in a performance level of a wireless connection in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Initially, a prior performance level associated with a wireless connection is determined (Operation 212). The prior performance level associated with the wireless connection may have been detected by one or more wireless devices in a wireless environment. The wireless devices, that detected the prior performance level, may or may not be involved in the wireless connection.

In an example, an access point detects a particular noise floor. The access point detects a wireless signal from a client device at a particular signal strength. A signal-to-noise ratio (SNR) is determined based on the particular noise floor and the particular signal strength. The SNR is determined as a prior performance level.

In another example, a client device is associated with a first access point. The client device detects that signal strengths of wireless signals received by the client device from the first access point are below a first threshold value, indicating that the client device should disassociate with the first access point and associate with another access point if possible. The client device also detects that signal strengths of wireless signals received by the client device from a second access point are above a second threshold value, indicating that the client device may associate with the second access point. The client device disassociates with the first access point. The first access point determines a time at which the disassociation occurs. The client device then associates with the second access point. The second access point determines a time at which the association occurs. The duration between the time at which the disassociation with the first access point occurs and the time at which the association with the second access point occurs is determined as a performance level and stored in a data repository. The stored performance level may be referred to as a prior performance level when being compared to another performance level corresponding to more recent measurements than the prior performance level.

In one or more embodiments, a current performance level associated with the wireless connection is determined (Operation 214). A particular period of time after the prior performance level is determined, the current performance level associated with the wireless connection is detected by one or more wireless devices in the wireless environment.

In an example, an access point detects a wireless signal from a client device at a first signal strength. The first signal strength is determined as a prior performance level. After 1 ms, the access point detects a wireless signal from the client device at a second signal strength. The second signal strength is determined as a current performance level.

In another example, a current performance level corresponds to a most recent measure of an amount of time between a client device disassociating with a first access point and associating with a second access point.

In one or more embodiments, an inquiry is made as to whether the prior performance level and the current performance level match a known pattern of performance levels (Operation 216). One or more historical patterns of performance levels were previously determined and stored in a database or other memory. Each historical pattern indicates a first performance level at a first time period, a second performance level at a second time period, and/or a difference between a first performance level at a first time period and a second performance level at a second time period. The prior performance level and the current performance level are compared to each of the historical patterns to determine whether there is a match.

In an embodiment, a match is found if the difference between the prior performance level and the current performance level is the same as or similar to a difference in performance levels indicated by a historical pattern. In an example, a signal strength of a wireless signal received from a client device at an access point is −50 dBm. After 5 ms, a signal strength of a wireless signal received from the client device at the access point is −60 dBm. The signal strength of −50 dBm is determined as a prior performance level and the signal strength of −60 dBm is determined as a current performance level. Meanwhile, a historical pattern indicates that there is a 10 dB decrease in the signal strengths of wireless signals received from a client device at an access point over a time period of 5 ms. The difference between the prior performance level and the current performance level is 10 dB and matches the historical pattern.

In an embodiment, each historical pattern of performance levels is associated with a likelihood of occurrence of an undesirable state of the wireless connection. If a particular historical pattern is associated with a likelihood of occurrence of an undesirable state that is above a particular threshold, then the prior performance level and the current performance level are compared to the particular historical pattern to determine whether there is a match. In an example, a historical pattern is that there is a 10 dB decrease in the signal strengths of wireless signals received from a client device at an access point over a time period of 5 ms. The historical pattern is determined to have occurred ten times in the past. Six out of the ten times, there was a failure in the wireless connection between the client device and the access point. The historical pattern is determined to be associated with a 60% likelihood that there will be a failure in the wireless connection. If a likelihood of 60% is above a particular threshold, then the prior performance level and the current performance level are compared to the historical pattern to determine whether there is a match.

In one or more embodiments, if the prior performance level and the current performance level do not match a known pattern, then the process for executing a corrective action in response to detecting a particular pattern in a performance level of a wireless connection ends. The prior performance level and the current performance level are stored as a new pattern in a performance level. The new pattern in the performance level is added to the database or other memory storing historical patterns in performance levels. The new pattern may be added to the database or other memory by a system and/or application. Alternatively, the new pattern may be added to the database or other memory by a user (such as an administrator). Hence, the database grows to include new information on patterns in performance levels, which may be used when executing corrective actions in the future.

In one or more embodiments, if the prior performance level and the current performance level matches a known pattern, then an inquiry is made as to whether the known pattern of performance levels is associated with a successful corrective action (Operation 218). A set of available corrective actions are stored in a database or other memory. A subset of the available corrective actions that were taken in response to a particular historical pattern of performance levels is stored in association with the particular historical pattern. Whether each of the subset of corrective actions was successful is also stored. A corrective action is considered successful if, for example, the corrective action improved the performance level associated with the wireless connection, the corrective action prevented a reduction in the performance level, and/or the corrective action resulted in avoiding a failure of the wireless connection.

In an example, a historical pattern indicates that there is a 10 dB decrease in the signal strengths of wireless signals received from a client device at an access point over a time period of 5 ms. A corrective action was executed, increasing a receive sensitivity of the access point. The wireless connection between the client device and the access point continued, and no failure of the wireless connection was detected. The corrective action of increasing the receive sensitivity is stored as a successful corrective action associated with the historical pattern.

In one or more embodiments, if the known pattern is not associated with a successful corrective action, then the process ends. Otherwise, the corrective action is selected and executed (Operation 220). The corrective action may be executed to improve the current performance level associated with the wireless connection, to prevent reduction of the current performance level, and/or to avoid failure of the wireless connection. In an embodiment, a corrective action is executed prior to the occurrence of a failure state and/or undesirable state of the wireless connection. The corrective action prevents the occurrence of the failure state and/or undesirable state.

In an embodiment, the prior performance level and the current performance level are stored as a new pattern in a performance level. The new pattern in the performance level is added to the database or other memory storing historical patterns in performance levels. The new pattern may be added to the database or other memory by a system and/or application. Alternatively, the new pattern may be added to the database or other memory by a user (such as an administrator). Corrective actions that are attempted in response to detecting the new pattern in a performance level, as well as whether the corrective actions failed or succeeded, are also recorded in the database. Hence, the database grows to include new information on patterns in performance levels and/or corrective actions, which may be used when executing corrective actions in the future.

D. Executing a Corrective Action to Establish a Wireless Connection

Figure 3:
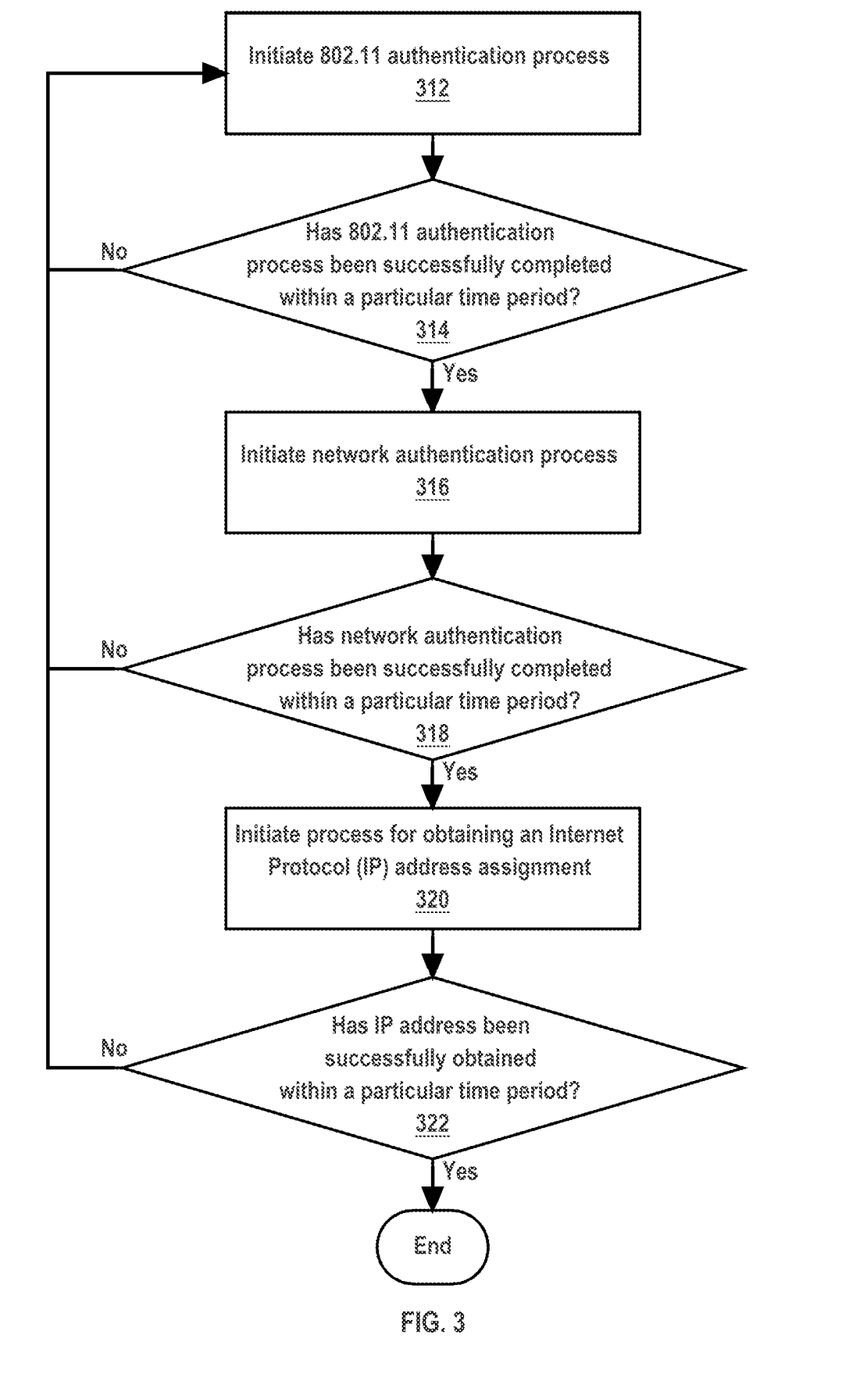
FIG. 3 shows an example set of operations for executing a corrective action to establish a wireless connection in accordance with one or more embodiments.

FIG. 3 shows an example set of operations for executing a corrective action to establish a wireless connection in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

Initially, an 802.11 authentication process is initiated between a client device and an access point, in accordance with one or more embodiments (Operation 312). In an embodiment, an 802.11 authentication process includes authenticating and associating a client device. First, a client device transmits a probe request to discover access points within the client device's proximity. The probe request advertises the client device's supported data rates and capabilities. An access point that receives the probe request and is associated with a compatible data rate transmits a probe response to the client device. The client device then transmits an authentication request to the access point. The authentication request may include a shared key, such as a Wired Equivalent Privacy (WEP) key, a Wi-Fi Protected Access (WPA) key, or a Wi-Fi Protected Access 2 (WPA2) key. The access point transmits an authentication response to the client device. At this point, the client device is authenticated but not yet associated. The client device then transmits an association request to the access point. If association is successful, the access point transmits an association response to the client device. The association response includes a status code indicating successful association. If the association is not successful, the access point transmits a status code indicating unsuccessful association. The client device is then authenticated and associated to the access point.

In one or more embodiments, an inquiry is made as to whether the 802.11 authentication process has been successfully completed within a particular time period (Operation 314). If the client device is authenticated and associated to the access point, then the 802.11 authentication process has been successfully completed.

In one or more embodiments, if the 802.11 authentication process is not successfully completed within the particular time period, then the 802.11 authentication process is re-executed and again initiated.

In one or more embodiments, if the 802.11 authentication process is successfully completed within the particular time period, then a network authentication process is initiated between the client device and the access point (Operation 316). In an embodiment, a network authentication process implements a port-based network access control. First, when an access point detects a client device that is not yet connected to a network, the access point enables a port for the client device and sets the port to an "unauthorized" state. Then the access point transmits a request for a client device to identify itself. The request may be included in one or more Extensible Authentication Protocol (EAP) Request Identity frames. A client device then transmits its identity to the access point. The identity may be included in one or more EAP-Response Identity frames. The access point then forwards the client device's identity to an authentication server, such as a RADIUS server. The message from the access point to the authentication server may be included in one or more RADIUS Access-Request frames. The authentication server then requests the credentials of the client device to verify the identity of the client device. As part of the request, the authentication server specifies the type of credentials that are required. The client device then transmits its credentials. If the credentials are valid, the authentication server transmits a status code indicating successful authentication, such as an EAP-Success message. Otherwise the authentication transmits a status code indicating unsuccessful authentication, such as an EAP-Failure message. If authentication is successful, then the access point sets the port to an "authorized" state and normal traffic is allowed between the client device and the network.

In one or more embodiments, an inquiry is made as to whether the network authentication process has been successfully completed within a particular time period (Operation 318). If the access point allows normal traffic between the client device and the network, then the network authentication process has been successfully completed. The particular time period used at Operation 318 may be the same as or different from the particular time period used at Operation 314. If, however, an error code or a failure occurs at any step within the network authentication process, then the network authentication process is not successfully completed.

In one or more embodiments, if the network authentication process is not successfully completed within the particular time period, then the 802.11 authentication process is re-executed and again initiated (Operation 312). The 802.11 authentication process is restarted without restarting the network authentication process and/or initiating a process for obtaining an IP address assignment. The 802.11 authentication process is restarted without providing an error message to an end user.

In one or more embodiments, if the network authentication process is successfully completed within the particular time period, then a process for obtaining an IP address assignment is initiated (Operation 320). In an embodiment, an IP address assignment process involves the use of DHCP. First, a client device sends a broadcast request, such as a DISCOVER request, to search for a DHCP server. Based on availability and usage policies, the DHCP server determines an appropriate IP address (if any) to assign to the client device. The DHCP server then temporarily reserves the particular IP address for the client device and sends back to the client device an OFFER packet, with the particular IP address. The client device transmits a REQUEST packet, indicating that the client device intends to use the particular IP address. The DHCP server sends an ACK packet, confirming that the client device has been given the particular IP address for a server-specified period of time.

In one or more embodiments, an inquiry is made as to whether an IP address has been successfully obtained within a particular time period (Operation 322). The particular time period used at Operation 322 may be the same as or different from the particular time period used at Operation 314 and/or the particular time period used at Operation 318. If, however, an error code or a failure occurs at any step within the process for obtaining an IP address assignment, then an IP address is not successfully obtained.

In one or more embodiments, if an IP address is not successfully obtained within the particular time period, then the 802.11 authentication process is re-executed and again initiated (Operation 312). The 802.11 authentication process is restarted without restarting the network authentication process and/or restarting the process for obtaining an IP address assignment. The 802.11 authentication process is restarted without providing an error message to an end user.

In one or more embodiments, if an IP address is successfully obtained within the particular time period, then a wireless connection has been successfully established, and the process ends.

E. Example Embodiment

Figure 4:
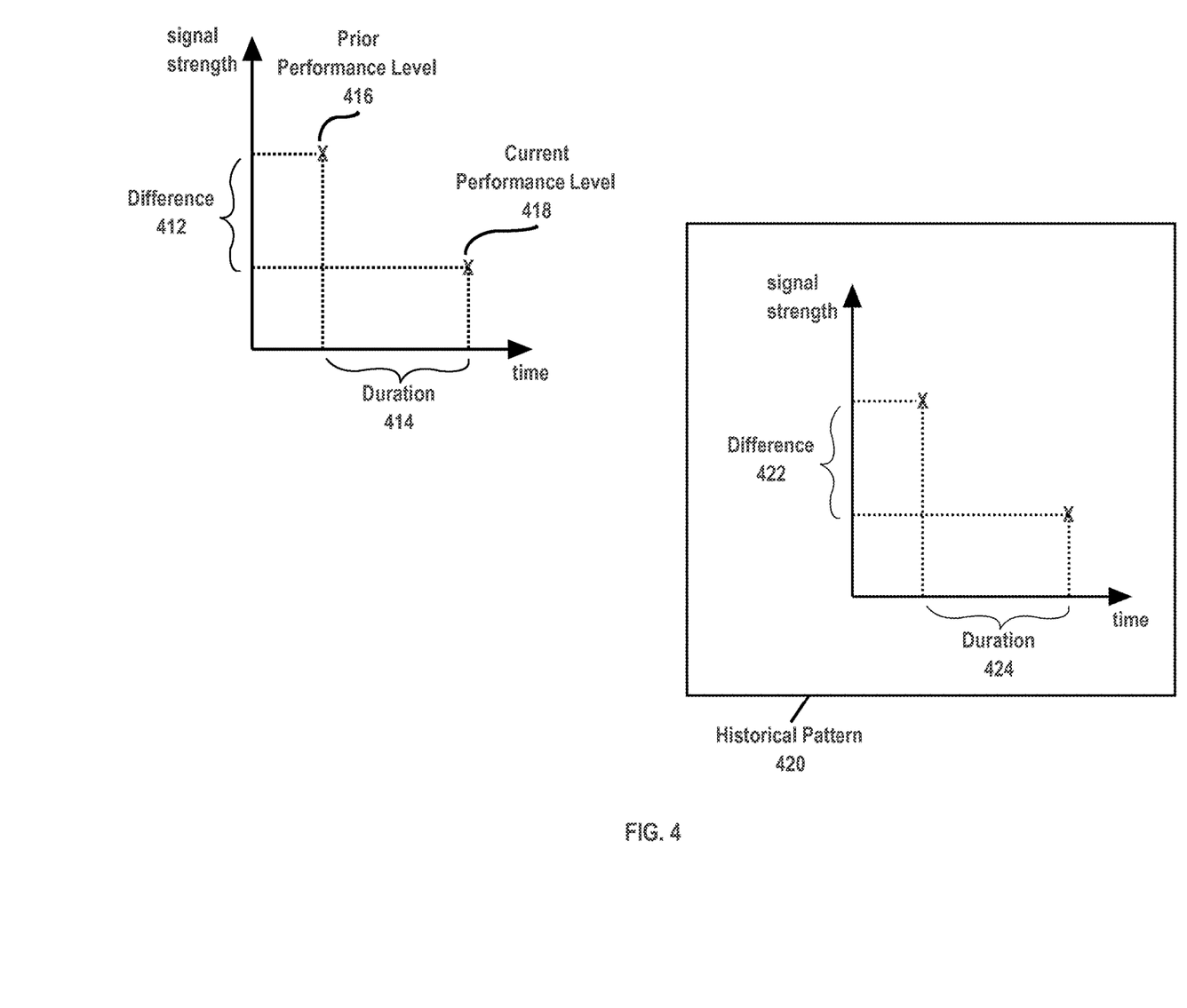
FIG. 4 illustrates an example of executing a corrective action in response to detecting a particular pattern in a performance level of a wireless connection, in accordance with one or more embodiments.

FIG. 4 illustrates an example of executing a corrective action in response to detecting a particular pattern in a performance level of a wireless connection, in accordance with one or more embodiments. Detailed examples are described below for purposes of clarity. Components and/or operations described below should be understood as one specific example which may not be applicable to certain embodiments. Accordingly, components and/or operations described below should not be construed as limiting the scope of any of the claims. Features, components, and/or operations described with regard to this example embodiment are not necessarily applicable to other embodiments.

In an example, a prior performance level 416 of a wireless connection between a particular client device and a particular access point is determined. The prior performance level 416 is that a signal strength of a wireless signal received from the particular client device at the particular access point is −50 dBm. After 5 ms, a current performance level 418 of the wireless connection is determined. The current performance level 418 is that a signal strength of a wireless signal received from the particular client device at the particular access point is −60 dBm. The difference 412 between the signal strengths is determined to be 10 dB. The duration 414 between the two signal strength determinations is 5 ms.

Historical patterns of performance levels of wireless connections, including historical pattern 420, are stored in a database. In addition, corrective actions that were taken in response to the historical patterns, and whether each corrective action was successful or not, are stored in association with the historical patterns in the database.

Historical pattern 420 includes a first signal strength at a first time period and a second signal strength at a second time period. The difference 422 between the first signal strength and the second signal strength is 10 dB. The duration 424 between the two signal strength determinations is 5 ms.

Difference 412 is the same as difference 422 (10 dB). Duration 414 is the same as duration 424 (5 ms). Therefore, a match is found between (a) the prior performance level 416 and the current performance level 418 and (b) historical pattern 420.

A successful corrective action associated with historical pattern 420 is reducing a MCS index of the wireless signals used in the wireless connection. By reducing the MCS index, the data rate is reduced. Lower data rates allows a wireless connection to be maintained at lower signal strengths. Hence, due to a reduced data rate, even though the signal strengths of wireless signals exchanged between a client device and an access point is decreasing, the wireless connection between the client device and the access point does not fail.

The corrective action of reducing the MCS index is selected and executed. The corrective action results in avoiding a failure of the wireless connection between the particular client device and the particular access point.

F. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

G. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
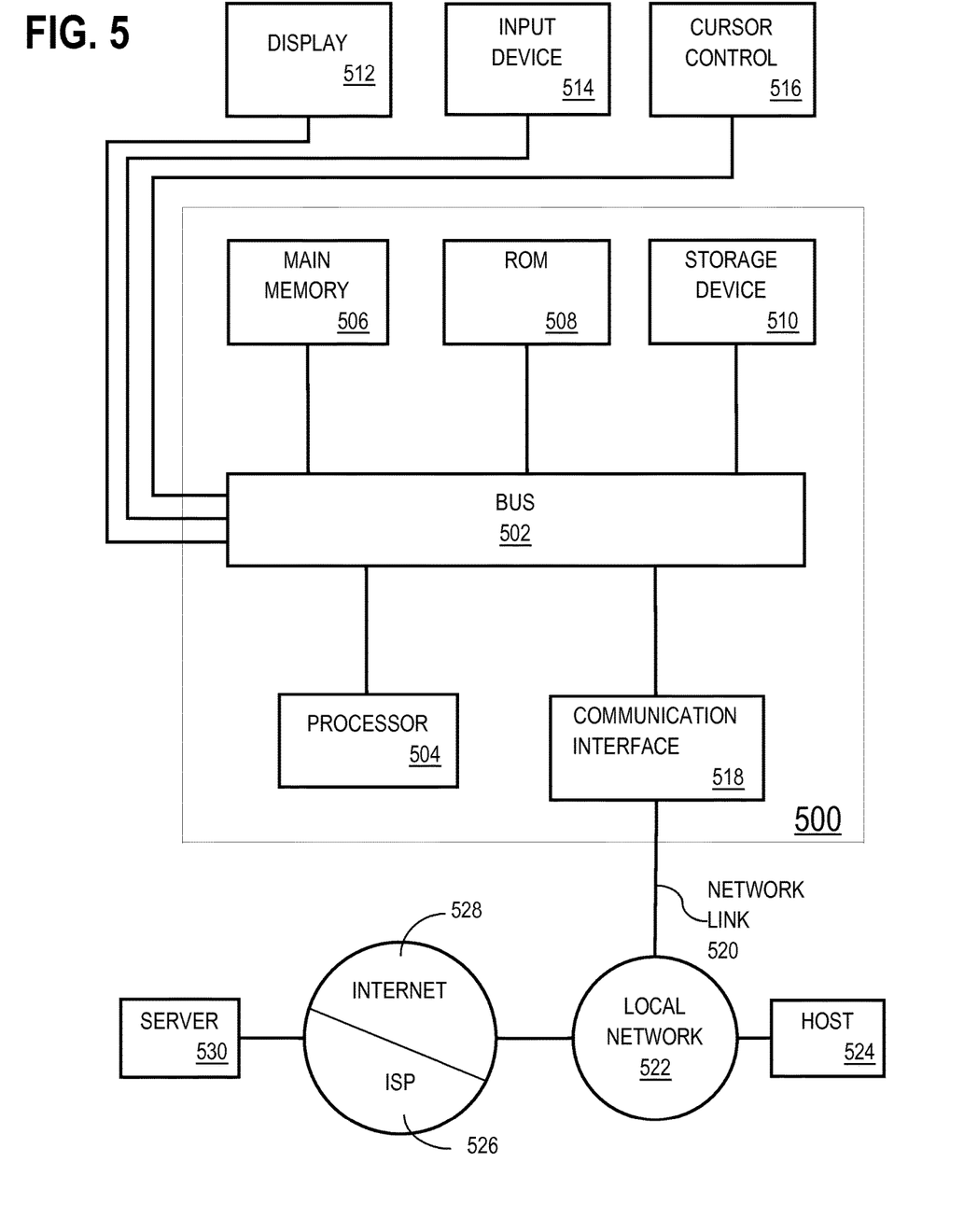
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   determining a current performance level associated with a wireless connection;
   making a comparison between the current performance level associated with the wireless connection and a prior performance level associated with the wireless connection;
   selecting a corrective action, based on a result of the comparison, from a plurality of corrective actions;
   executing the corrective action.

2. The medium of claim 1, wherein the determining operation is performed prior to detecting a failure state in association with the wireless connection.

3. The medium of claim 1, wherein the determining operation is performed prior to detecting an undesirable state of the wireless connection.

4. The medium of claim 3, wherein selecting and executing the corrective action is further responsive to:
   identifying a likelihood of occurrence of the undesirable state of the wireless connection based at least on the current performance level;
   determining that the likelihood of occurrence of the undesirable state of the wireless connection is above a particular threshold value.

5. The medium of claim 4, wherein the likelihood of occurrence of the undesirable state of the wireless connection is determined based on a pattern comprising the current performance level and a prior performance level.

6. The medium of claim 1, wherein executing the corrective action improves the current performance level associated with the wireless connection.

7. The medium of claim 1, wherein executing the corrective action prevents reduction of the current performance level associated with the wireless connection.

8. The medium of claim 1, wherein executing the corrective action results in avoiding failure of the wireless connection.

9. The medium of claim 1, wherein the current performance level indicates an amount of time needed for a client device to switch from associating with a first access point to associating with a second access point.

10. The medium of claim 1, wherein the current performance level indicates a received signal strength or a Signal-To-Noise Ratio (SNR) of wireless signals exchanged between a client device and an access point.

11. A method comprising:
    determining a current performance level associated with a wireless connection;
    making a comparison between the current performance level associated with the wireless connection and a prior performance level associated with the wireless connection;
    selecting a corrective action, based on a result of the comparison, from a plurality of corrective actions;
    executing the corrective action.

12. The method of claim 11, wherein the determining operation is performed prior to detecting a failure state in association with the wireless connection.

13. The method of claim 11, wherein the determining operation is performed prior to detecting an undesirable state of the wireless connection.

14. The method of claim 13, wherein selecting and executing the corrective action is further responsive to:
   identifying a likelihood of occurrence of the undesirable state of the wireless connection based at least on the current performance level;
   determining that the likelihood of occurrence of the undesirable state of the wireless connection is above a particular threshold value.

15. A non-transitory computer readable medium comprising instructions which, when executed by one or more hardware processors, causes performance of operations comprising:
   attempting and successfully completing an 802.11 authentication process to associate a client device with an access point;
   attempting and not successfully completing an Internet Protocol (IP) address assignment process to receive an IP address assignment;
   responsive to not successfully completing the IP address assignment process: re-executing the 802.11 authentication process to associate the client device with the access point, without first re-attempting the IP address assignment process.

16. The medium of claim 15, wherein the determining operation comprises determining that the client device did not receive the IP address assignment.

17. The medium of claim 16, wherein determining that the client device did not receive the IP address assignment comprises determining that the client device did not receive the IP address assignment within a particular period of time.

18. The medium of claim 15, wherein the determining operation comprises determining that the client device did not complete the network authentication process for connecting to the network associated with the access point.

19. The medium of claim 18, wherein determining that the client device did not complete the network authentication process comprises determining that the client device did not complete the network authentication process within a particular period of time.

20. The medium of claim 15, wherein re-executing the 802.11 authentication process restarts a process for establishing the wireless connection between the client device and the access point.

* * * * *